Feb. 9, 1960
K. R. DURST ET AL
2,924,301
BRAKE MECHANISM
Filed Sept. 29, 1958
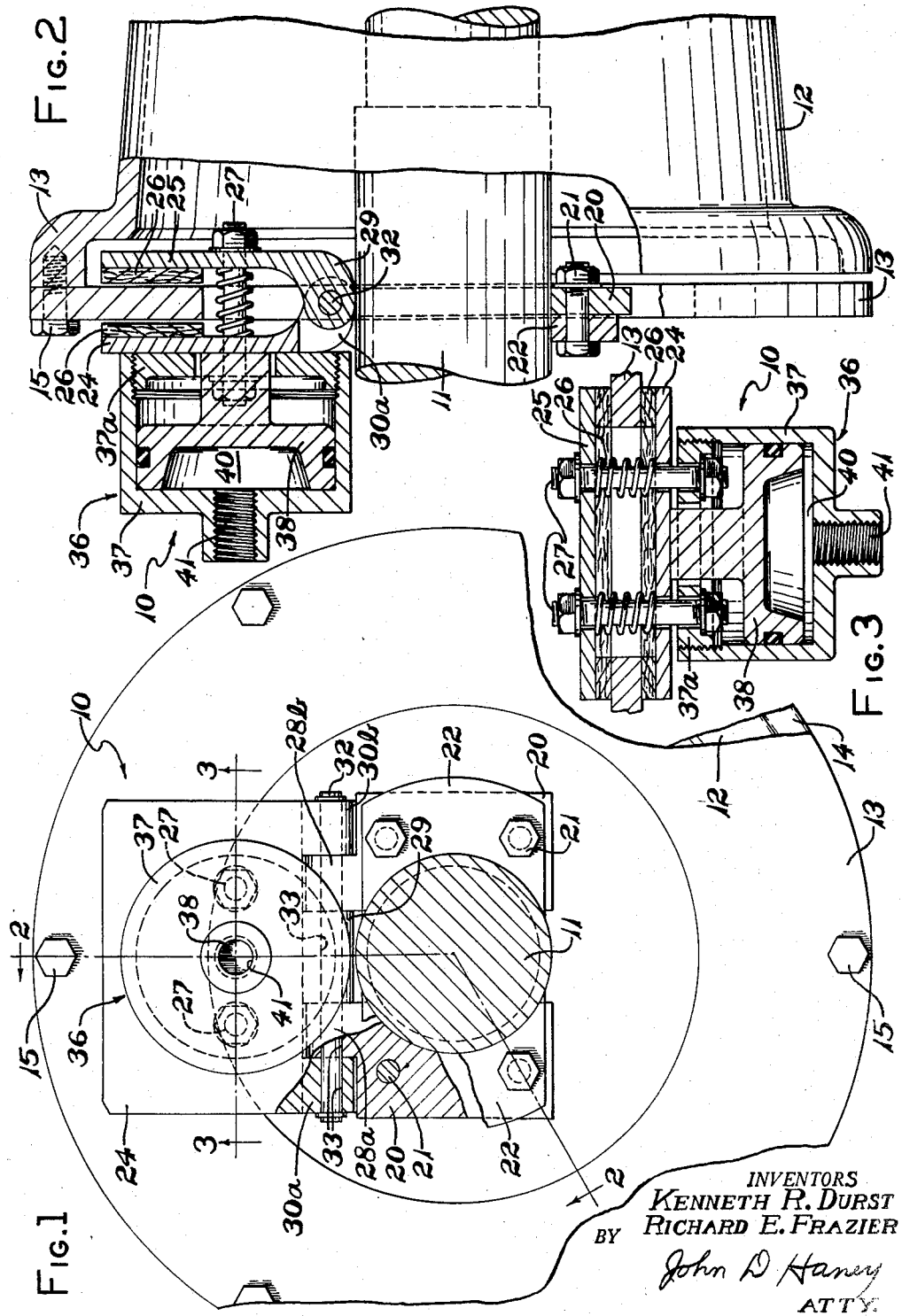
INVENTORS
KENNETH R. DURST
RICHARD E. FRAZIER
BY
John D. Haney
ATTY.

2,924,301
BRAKE MECHANISM

Kenneth R. Durst, Troy, and Richard E. Frazier, Pleasant Hill, Ohio, assignors to The B. F. Goodrich Company, New York, N.Y., a corporation of New York Application September 29, 1958, Serial No. 763,937

1 Claim. (Cl. 188—73)

This invention relates to an improved brake mechanism and to an assembly of such brake mechanism with a wheel.

The present invention provides a relatively inexpensive, light brake mechanism especially suitable for light low speed aircraft of the type designed for only several passengers. The brake is a disc type brake of the so-called "spot brake" class in which the rotatable braking member carried by the wheel is a full annulus and the non-rotatable braking members engageable therewith are equivalent in area to only a small sector of the annular rotatable member. The non-rotatable braking members in this new brake are hinged to a rigid mounting member that is rigidly engaged to the wheel axle structure. These hinged members extend generally radially of the wheel to embrace the opposing surfaces of the rotatable member. The hinged members are adapted to be swung pivotally into engagement with the rotatable braking members by an actuating mechanism which exerts braking force on the hinged braking members at a region of each intermediate their respective hinge portions and their braking faces.

This brake structure has been found to have substantially equal lining wear in the radial direction of the lining, notwithstanding the fact that the braking pressure is exerted by hinged members. This advantageous result occurs apparently before the deflection of the outer region of the hinge members tends to compensate for the differential rate of lining wear normally expected in its radial direction.

The brake is advantageously actuated hydraulically by mutually engageable actuation members which are supported solely by the hinge members. The actuated members are particularly designed and arranged so that the brake may be very simply adjusted to compensate for lining wear and the slack which would otherwise result.

A brake mechanism together with a wheel assembled therewith which is constructed in accordance with and embodying the present invention is shown in the accompanying drawings.

In the drawings:

Fig. 1 is a view of the wheel and brake assembly looking in the axial direction of the wheel;

Fig. 2 is a cross-sectional view taken on the line 2—2 of Fig. 1, the brake mechanism being shown in released position; and Fig. 3 is a detailed fragmentary cross-sectional view taken on the line 3—3 of Fig. 1, but with the brake parts shown in their engaged position.

The assembly comprises a brake mechanism 10 mounted on an axle structure 11 on which a wheel 12 is mounted for rotation relative to the axle. The wheel 12 carries an annular brake disc 13 secured to one of its bead flanges 14 by bolts 15 so that the disc 13 rotates with the wheel.

The brake mechanism includes a rigid mounting plate 20 which is fastened by bolts 21 to a torque flange 22 which is integral with the non-rotatable axle 11.

The mounting plate 20 has attached to it two non-rotatable lining carrier members 24 and 25 which extend from one edge of the mounting plate 20 radially outward to embrace the opposing plane surfaces of the brake disc 13. Near the outer end of each lining carrier 24 and 25 there is attached a suitable friction lining material 26 which directly engages the opposing radial faces of the brake disc 13 and which serves as the braking faces of the lining carriers. The lining carriers, of course, are the engageable non-rotatable brake members.

The lining carriers 24 and 25 each have a hinge connection with the mounting plate 20. As shown in Fig. 1 the mounting plate 20 at its upper edge has a pair of aligned lug members 28a and 28b. The lower edge of the inner lining carrier 25 includes a narrow lug 29 which fits between the lugs 28a and 28b. The outer or left (Fig. 2) lining carrier 24 at its lower edge is formed with widely spaced lugs 30a and 30b which externally embrace the lugs 28a and 28b. A common hinge pin 32 extends through coaxial holes 33 in each lug which register with each other when the lugs are assembled properly as shown in Fig. 1. With this arrangement the lining carriers 24 and 25 may be moved or swung pivotally about the hinge pin 32 in an arc relative to the brake mounting member 20.

In this embodiment of the invention, the brake member is hydraulically actuated by a hydraulic unit 36 carried by the lining carriers 24 and 25. The hydraulic actuating unit 36 includes two main parts, a cup shaped casing member 37 inside of which a piston member 38 is slidable and is maintained in sealed engagement by peripheral O-ring. Between the piston 38 and the casing 37 there is a fluid chamber 40 and a connection 41 through the casing 37 through which fluid pressure may be introduced into chamber 40.

The casing member 37 includes an associated end closure member 37a which is in threaded engagement with the mouth of the casing member 37. The casing member 37 together with its end closure member 37a is supported only by means of two draw rods 27 which (see Fig. 3) extend loosely through the member 37a and through the adjacent lining carrier 24 and then under or through the center opening of disc 13, and then through the lining carrier 25 in the manner shown in Fig. 3. It may be noted in Fig. 3 that the stud members or draw rods 27 extend loosely through holes in the lining carriers 24 and 25, respectively, and the opposing outer ends of the draw rod are fastened by nuts 44 and 45, respectively. It may be noted in Fig. 1 that the draw rods 27 are parallel to each other and at equal radial distances from the central rotational axis of the wheel.

Between the lining carriers 24 and 25 each draw rod is surrounded by a spring 48 which is caged under compression between the lining carriers so as to bias the lining carriers outwardly away from each other. The spring thus urges lining carrier 25 against its retaining nut 44 and urges lining carrier 24 snugly against the bottom of member 37a of the actuation casing 37 when the brake is released as in Fig. 2. It is to be noted particularly that member 37a is not integrally connected to the adjoining lining carrier 24. The piston member 38 of the actuating mechanism includes a center shank member 50 (Figs. 2 and 3) which extends through an opening 51 in closure member 37a and bears directly against the lining carrier 24 in plane of the draw rod members 27.

The parts of the brake mechanism in Fig. 2 are shown in their normally released position in which the lining carriers 24—25 are spaced away from the opposing radial faces of the disc 13 by the biasing springs 48. In response to the introduction of fluid pressure into chamber 40, the shank portion 50 of the piston member 38 pushes directly against lining carrier 24 and simultaneously the casing member 37 (together with its closure member 37a) moves leftward and thus exerts an axial force on the draw rods 27 in a direction counter to the force exerted by shank 50 of piston member 38. Accordingly, the lining carriers 24 and 25 are pivoted simultaneously toward each other about their hinge pin 32 to press their friction linings 26 against the opposite sides of the brake disc 13. Normally the casing member 37 and member 37a will be displaced slightly away from the lining carrier 24 when the brake is fully actuated, as shown in Fig. 3. On release of pressure the biasing springs 48 expand to return the parts to the position shown in Fig. 2.

It is to be noted that the actuation force applied through the draw rods 27 and through the shank portion 50 of piston 38 is a common plane intermediate the friction lining or braking faces 26 of the lining carriers and their hinged side. By applying the braking force in this location to the braking carriers, the outer portions of the carriers radially beyond the force-applying plane tend to deflect somewhat away from the brake disc 13 so that a slightly higher braking pressure is encountered near the inner radial circumference of the brake disc 13 than in the regions near the radial outer margins of the brake disc. This pressure differential in a radial direction across the disc appears to compensate for the fact that lining wear is normally more severe near the faster moving radially outer portion of the brake disc. Thus wear on the lining members 26 in this brake design is unusually even, notwithstanding the fact that the lining members 24 and 25 are swung pivotally into engagement with the brake disc 13.

In the fully released position of the actuation mechanism it may be noted as shown in Fig. 2 that the piston member 38 is seated snugly against the bottom of the casing member 37 and with its shank seated firmly against the lining carrier 24. To adjust this brake for wear it is merely necessary to screw the casing member 37 down further and further onto the peripheral threads of the end closure member 37a. By threading the casing member 37 onto member 37a in this manner, the piston 38 and its shank 50 are urged forwardly against the lining carrier 24. At the same time such threading moves the closure member 37a away from the lining carrier 24, thereby drawing the opposing lining carrier 25 to a position wherein its lining 26 is closer to the radial opposing face of the brake disc 13. By this simple threaded adjustment of the casing member 37 both lining carriers may be easily adjusted to compensate for wear of their respective linings 26.

Variations in the construction disclosed may be made within the scope of the appended claims.

We claim:

A wheel and brake assembly comprising a wheel adapted for rotation on a non-rotatable axle mechanism, a braking disc disposed in a plane coaxial with the rotational axis of the wheel and adapted for rotation with the wheel, a brake mounting flange on said axle, a brake mounting member engaged with said flange and including a pair of non-rotatable brake members each in hinged engagement with the brake mounting member and embracing opposite sides of said disc, a common hinge connection linking said brake mounting member and both said non-rotatable brake members, the connection lying in the rotational plane of said disc, said braking members including opposing braking faces engageable with opposite sides of said disc, and brake actuating mechanism comprising two inter-engaging actuation members one externally embracing the other and both cooperating to define a fluid pressure chamber, a pair of draw rods connected to one of said hinged braking members at a region thereof between its braking face and its hinged portion, the draw rods extending in parallelism through the opposing hinged member in the region intermediate its braking face and its hinged portion and being connected to the external one of said actuation members, the internal one of said actuating members having a projection engaged with the latter said hinged member in the region thereof between the locations where the two draw rods project therethrough so that said draw rods and said projection lie in a common plane parallel and normal to said hinge connection, and said actuation members being responsive to the introduction of fluid pressure into said pressure chamber for relative displacement so that said external actuation member through said draw rods pulls one hinged brake member forcibly against one side of said rotatable braking member and so that the internal actuation member engages said opposing hinged brake member to push it against the opposite side of said rotatable braking member, and means embracing each said draw rod between said hinged brake members for biasing said hinged members apart from each other.

References Cited in the file of this patent

UNITED STATES PATENTS

| | | |
|---|---|---|
| 1,776,765 | Ferris | Sept. 23, 1930 |
| 2,548,008 | Franklin | Apr. 10, 1951 |
| 2,689,024 | Trevaskis | Sept. 14, 1954 |

FOREIGN PATENTS

| | | |
|---|---|---|
| 734,856 | Great Britain | Aug. 10, 1955 |

UNITED STATES PATENT OFFICE
CERTIFICATE OF CORRECTION

Patent No. 2,924,301

February 9, 1960

Kenneth R. Durst et al.

It is hereby certified that error appears in the printed specification of the above numbered patent requiring correction and that the said Letters Patent should read as corrected below.

Column 1, line 41, for "before" read -- because --.

Signed and sealed this 16th day of August 1960.

(SEAL)
Attest:
KARL H. AXLINE
Attesting Officer

ROBERT C. WATSON
Commissioner of Patents